United States Patent
Deak et al.

(10) Patent No.: US 10,792,907 B2
(45) Date of Patent: Oct. 6, 2020

(54) METHODS AND APPARATUS FOR THIN-WALLED GEOMETRIES FOR ADDITIVE MANUFACTURING

(71) Applicant: General Electric Company, Schenectady, NY (US)

(72) Inventors: Stephen Michael Deak, Liberty Township, OH (US); Daniel Joerger, Cincinnati, OH (US); Travis Sands, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/429,238

(22) Filed: Jun. 3, 2019

(65) Prior Publication Data

US 2019/0283391 A1    Sep. 19, 2019

Related U.S. Application Data

(62) Division of application No. 15/268,192, filed on Sep. 16, 2016, now Pat. No. 10,343,388.

(51) Int. Cl.
*B33Y 10/00* (2015.01)
*B29C 64/135* (2017.01)
(Continued)

(52) U.S. Cl.
CPC ............ *B33Y 10/00* (2014.12); *B29C 64/135* (2017.08); *B29C 64/386* (2017.08); *B33Y 30/00* (2014.12);
(Continued)

(58) Field of Classification Search
CPC ....... B33Y 10/00; B33Y 30/00; B29C 64/386; B29C 64/135; B29C 64/153;
(Continued)

(56) References Cited

U.S. PATENT DOCUMENTS

| | | | |
|---|---|---|---|
| 5,182,056 A | 1/1993 | Spence et al. | |
| 6,129,884 A | 10/2000 | Beers et al. | |
| 2013/0277891 A1 | 10/2013 | Teulet | |

FOREIGN PATENT DOCUMENTS

| | | |
|---|---|---|
| CN | 103639411 A | 3/2014 |
| DE | 4416901 A1 | 11/1995 |
| JP | H07137141 A | 5/1995 |

OTHER PUBLICATIONS

Chinese Office Action Corresponding to Application No. 2017800704618 dated Sep. 23, 2019.
(Continued)

*Primary Examiner* — Stella K Yi
(74) *Attorney, Agent, or Firm* — Dority & Manning, P.A.

(57) ABSTRACT

The present disclosure generally relates to methods and apparatuses for additive manufacturing (AM) that utilize a pulsed laser to solidify a liquid photopolymer. The method includes scanning a first portion of the photopolymer with the laser at a first draw speed, wherein the first portion of the photopolymer corresponds to a first portion of the part that has a width less than a threshold width. The method also includes scanning a second portion of the photopolymer with the laser at a second draw speed that is greater than the first draw speed, wherein the second portion of the photopolymer corresponds to a second portion of the part that has a width greater than the threshold width.

18 Claims, 9 Drawing Sheets

(51) Int. Cl.
    *B33Y 30/00*     (2015.01)
    *B29C 64/386*     (2017.01)
    *B22F 3/105*     (2006.01)
    *B29C 64/153*     (2017.01)
    *B29C 64/264*     (2017.01)
    *B33Y 50/02*     (2015.01)
    *B29K 105/00*     (2006.01)

(52) U.S. Cl.
    CPC ..... *B22F 3/1055* (2013.01); *B22F 2003/1056* (2013.01); *B22F 2003/1057* (2013.01); *B29C 64/153* (2017.08); *B29C 64/264* (2017.08); *B29K 2105/0058* (2013.01); *B33Y 50/02* (2014.12); *Y02P 10/295* (2015.11)

(58) Field of Classification Search
    CPC ..... B29C 64/273; B29C 64/268; B29C 64/10; B29C 64/20; B29C 65/4865; B29C 64/124; B22F 2003/1056; B22F 2003/1058; B22F 3/1055
    See application file for complete search history.

(56) References Cited

OTHER PUBLICATIONS

International Search Report and Written Opinion Corresponding to Application No. 2017047490 dated Oct. 19, 2017.

METHODS AND APPARATUS FOR THIN-WALLED GEOMETRIES FOR ADDITIVE MANUFACTURING

CROSS REFERENCE TO RELATED APPLICATIONS

This application claims priority to, and is a divisional application of, U.S. patent application Ser. No. 15/268,192 filed Sep. 16, 2016 which is incorporated by reference in its entirety herein.

INTRODUCTION

The present disclosure generally relates to methods for additive manufacturing (AM) based on computer aided design (CAD) models.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses electromagnetic radiation such as a laser beam, to solidify a photopolymer, creating a solid three-dimensional object.

Figure 1:
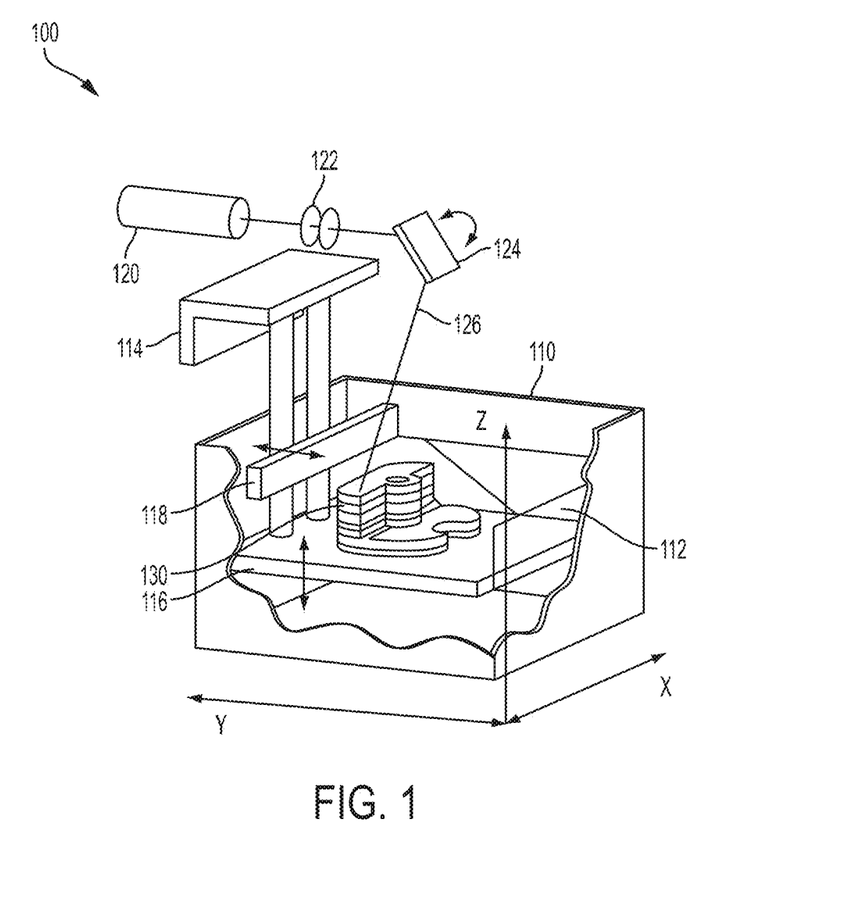
FIG. 1 is schematic diagram showing an example of a conventional apparatus for additive manufacturing.

FIG. 1 is schematic diagram showing a perspective view of an exemplary conventional apparatus 100 for additive manufacturing. The apparatus 100 uses selective laser activation (SLA) such as disclosed in U.S. Pat. No. 5,256,340, assigned to 3D Systems, Inc. to form a part 130 as a series of layers. The apparatus 100 includes a vat 110 that holds a liquid photopolymer 112, which may also be referred to as a resin. A build plate 116 is oriented in an x-y plane and forms the base upon which the part 130 is formed. An elevator 114 moves the build plate 116 along a z-axis orthogonal to the x-y plane. A sweeper 118 spreads the liquid photopolymer 112 across the build plate 116 and previously solidified layers of the part 130.

A laser 120 provides a laser beam 126 that solidifies the liquid photopolymer 112 according to a curing depth, which generally corresponds to a layer thickness. Lenses 122 adjust properties of the laser beam 126 such as beam width. A scanning mirror 124 reflects the laser beam 126 at various angles to scan a pattern in a top layer of the liquid photopolymer 112. The apparatus 100 is under the control of a computer 140 that directs the scanning mirror 124 as well as the elevator 118 and laser 120. The computer controls the apparatus 100 such that the laser 120 solidifies a scan pattern in the top layer of the liquid photopolymer 112. The elevator 114 then moves the build plate 116 downward along the z-axis and the sweeper 118 spreads the liquid photopolymer 112 to form a new top layer above the previously solidified photopolymer. The process continues layer by layer until the part 130 is formed on the build plate 116.

Various additive manufacturing apparatuses operate on a slice-based modelling technique. For example, as described in U.S. Pat. No. 5,184,307, a stereolithography system will typically form a three-dimensional part in accordance with a corresponding object representation, which representation may be formed in a CAD system or the like. Before such a representation can be used, however, it must be sliced into a plurality of layer representations. The stereolithography system will then, in the course of building up the object in a stepwise layer-by-layer manner, selectively expose the untransformed layers of material in accordance with the layer representations to form the object layers, and thus, the object itself.

When exposing the untransformed layers of material, the scanning mirror 124 traces a pattern in the layer. Generally, the stereolithography system will control the scanning mirror 124 to trace the outline of any shapes in the layer, then fill the shape in with a series of hatch lines. The present inventors have discovered that various shapes such as thin walls do not necessarily form as solid parts. Instead, the shape may include unsolidified liquid photopolymer within the part. Generally, stereolithography systems are designed for rapid prototyping to illustrate a design concept. Such uses do not require consistent material properties or strict manufacturing tolerances. Accordingly, unsolidified liquid photopolymer may be acceptable for rapid prototyping. When stereolithography is used in commercial manufacturing, however, unsolidified liquid photopolymer within a part results in poor material properties (e.g., structural weakness) and the parts do not satisfy manufacturing tolerances.

One solution to unsolidified liquid photopolymer is to increase the power of the laser 120. The increased power, however, causes greater cure depths in the z-dimension in some portions of the part. This The present inventors have further discovered that the unsolidified liquid photopolymer within the part is due to draw speeds. Generally, available additive manufacturing apparatuses set the draw speed to finish parts as quickly as possible. Available additive manufacturing apparatuses do not allow user control of the draw speed.

In view of the above, it can be appreciated that there are problems, shortcomings or disadvantages associated with AM techniques, and that it would be desirable if improved methods of forming thin walled structures were available.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect, the disclosure provides a method of manufacturing a part using a stereolithography apparatus that cures a liquid photopolymer into a solid polymer using a laser. The method includes scanning a first portion of the photopolymer with the laser at a first draw speed, wherein the first portion of the photopolymer corresponds to a first portion of the part that has a width less than a threshold width. The method also includes scanning a second portion of the photopolymer with the laser at a second draw speed that is greater than the first draw speed, wherein the second portion of the photopolymer corresponds to a second portion of the part that has a width greater than the threshold width.

In another aspect, the disclosure provides a stereolithography apparatus including a vat containing liquid photopolymer resin, a pulsed laser that produces a laser pulses that irradiate the liquid photopolymer resin thereby solidifying the liquid photopolymer resin; and a scanning mirror that moves the laser beam across a surface of the liquid photopolymer resin. The stereolithography apparatus also includes a memory storing executable instructions and a processor communicatively coupled to the memory and configured to execute the instructions to control the pulsed laser and scanning mirror. The instructions, when executed, control the apparatus to scan a first portion of the liquid photopolymer resin with the laser at a first draw speed, wherein the first portion of the photopolymer corresponds to a first portion of a part that has a width less than a threshold width and scan a second portion of the photopolymer with the laser at a second draw speed that is greater than the first draw speed, wherein the second portion of the photopolymer corresponds to a second portion of the part that has a width greater than the threshold width.

In another aspect, the disclosure provides a method of manufacturing a part using a stereolithography apparatus that cures a liquid photopolymer into a solid polymer using a laser. The method includes scanning the liquid photopolymer using a pulsed laser having a repetition rate of at least 67,000 pulses per second at a draw speed less than 50 inches per second.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Figure 2:
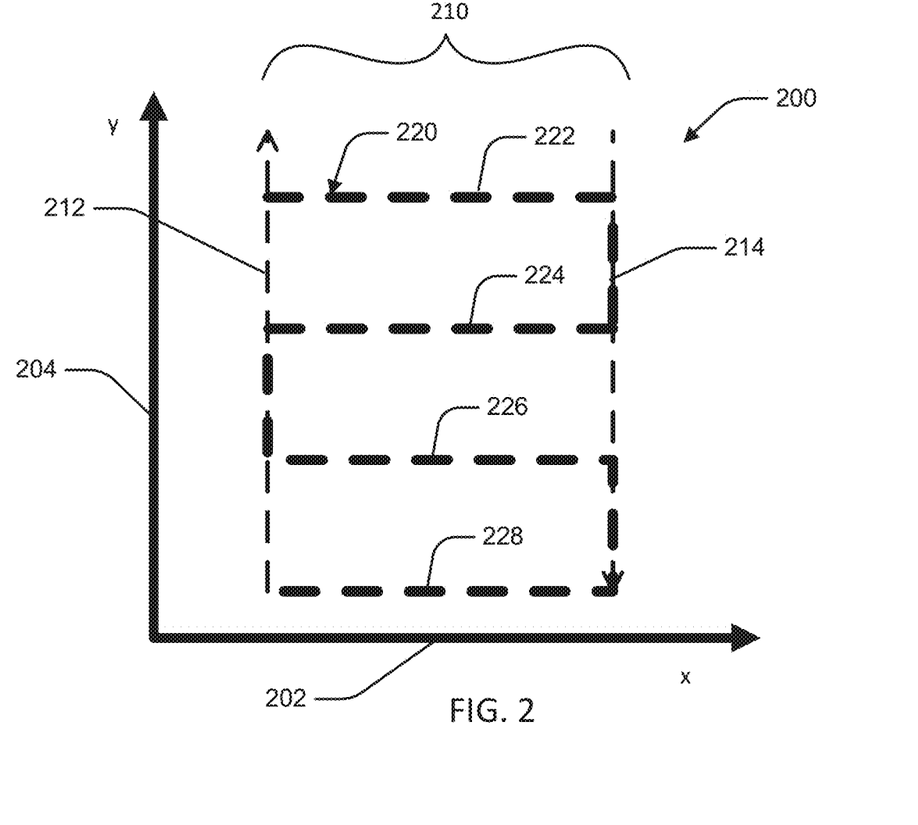
FIG. 2 illustrates a schematic diagram showing a scan pattern for a thin walled portion of a part.

FIG. 2 illustrates a schematic diagram showing a scan pattern 200 for a horizontal cross section of a part. The horizontal cross section lies in an x-y plane along an x-axis 202 and a y-axis 204. It should be appreciated that the part also extends along a z-axis orthogonal to the x-y plane. The part is formed along the z-axis by layering scan patterns in the x-y plane. Generally, the scan pattern is derived from a layer representation of an object. The apparatus 100 analyzes the layer representation to find the edges of shapes (e.g., polygons). The apparatus 100 then plots a scan pattern that first traces the edges of the shapes. The apparatus 100 then adds hatch lines to the scan pattern to fill the internal space between the edges with a series of overlapping lines.

The scan pattern 200 is for a part including a thin walled portion 210. The part may include other portions that are not shown. A thin wall portion is generally less than 0.030 inch thick. In an aspect, a thin wall portion may be 0.020 inch thick, 0.010 inch thick, or thinner. The scan pattern 200 includes a first edge line 212 extending the length of the thin walled portion 210 and a second edge line 214 extending the length of the thin walled portion 210. The apparatus 100 may scan the first edge line 212 and the second edge line 214 in opposite directions. The scan pattern 200 also includes hatch lines 220. The hatch lines 220 are generally perpendicular to the first edge line 212 and the second edge line 214. In an aspect, the hatch lines 220 may be a single path including hatch segments 222, 224, 226, 228 between the first edge line 212 and second edge line 214 as well as segments that extend along the first edge line 212 and second edge line 214 for the width between the hatch segments. In another aspect, the hatch lines 220 are a series of unconnected hatch segments 222, 224, 226, 228.

A distance between the hatch segments 222, 224, 226, 228 is based on a beam width of the laser 120 and an overlap percentage. The distance between the hatch segments 222, 224, 226, 228 is set so that the scanned area overlaps by the overlap percentage. In an aspect, the laser 120 is a pulsed laser that radiates the liquid photopolymer 112 in a series of pulses at a repetition rate. Various lasers may be used that produce pulses at desired wavelengths with desired repetition rates. For example, available SLA systems have a repetition rate between 25,000 and 200,000 cycles per second. In an aspect, the repetition rate is at least 67,000 cycles per second.

The apparatus 100 traces the scan pattern 200 at a draw speed. The pulses of the laser 120 irradiate a series of circles in the liquid photopolymer 112 as the scanning mirror 124 traces the scan pattern. In an aspect, for each circle, the liquid photopolymer closest to the center is cured, but the photopolymer near the edges of the circle do not receive the same intensity of radiation and do not fully cure, or do not cure to the same depth. Depending on the draw speed, the circles irradiated in consecutive pulses will overlap. The overlapping portions are exposed to a greater amount of radiation and therefore cure to a greater depth.

Figure 3:
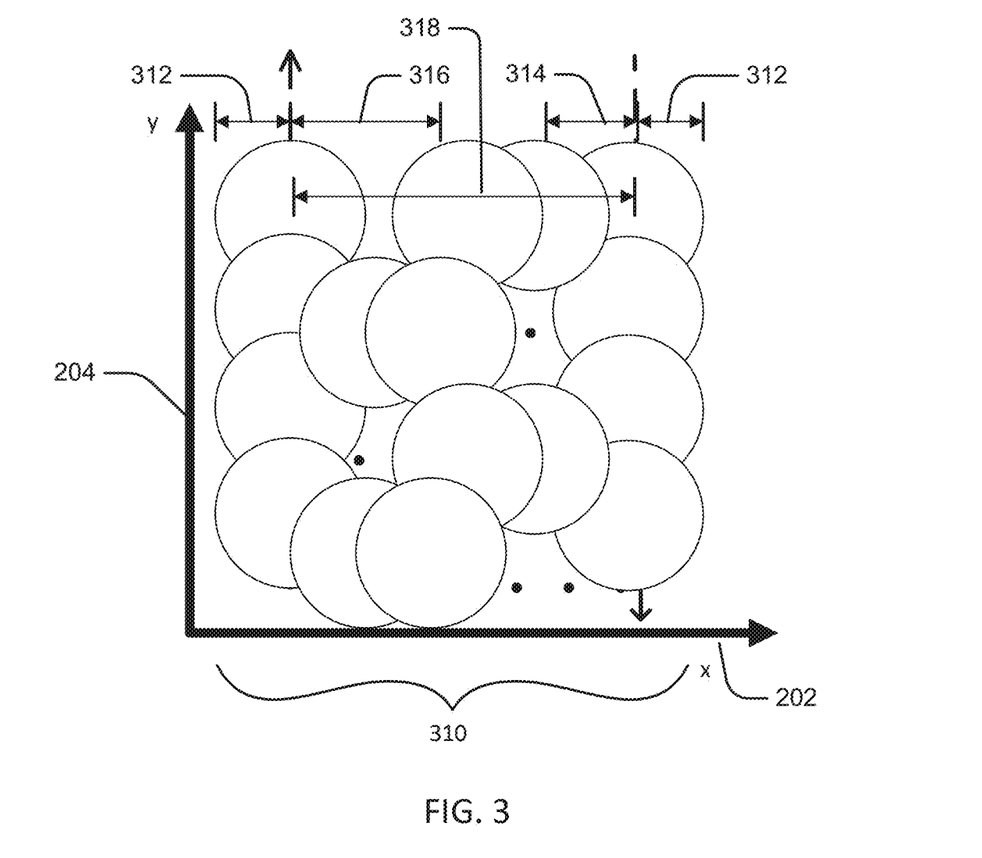
FIG. 3 illustrates a schematic diagram showing the locations of laser pulses according to the scan pattern of FIG. 2 with a draw speed of approximately 100 inches per second.

FIG. 3 illustrates an example part 300 including a thin walled portion formed using conventional techniques and a draw speed of approximately 100 inches per second. The part 300 is formed using the scan pattern 200 including the first edge line 212, the second edge line 214, and the hatch segments 222, 224, 226, 228. As illustrated, the width 310 of the part 300 is wider than the length of the hatch segments 222, 224, 226, 228 by a line width compensation 312, which is approximately half of the cured line width. For example, the line width compensation 312 may be approximately 1 mil or 0.001 inch.

The part 300 also includes gaps. In a finished part, the gaps may be filed with unsolidified liquid photopolymer 112, or the liquid photopolymer 112 may leak out of the gaps, leaving a porous structure. The gaps may be the result of a shutter operation of the apparatus 100. When the scanning mirror 124 moves the beam over the previously scanned portions of the first edge line 212 and the second edge line 214, the lenses 122 close a shutter to prevent overexposure of the already solidified photopolymer. When the scan pattern 200 includes quick direction changes for the hatch lines of a thin walled structure, the shutter keeps the laser 120 from forming a portion of the hatch lines. For example, the lenses 122 may close the shutter a pre-edge distance 314 before reaching an edge line and open the shutter a post-edge distance 316 after moving past the edge line. In an aspect, the pre-edge distance 314 may be based on a time of approximately 10 µs, and the post-edge distance 316 may be based on a time of approximately 35 µs. For a part with a thin-walled portion having a width of 0.01 inch, the line width compensation 312 results in a scanning length 318 of hatch segments 222, 224, 226, 228 of 0.008 inch. When the conventional draw speed determination is used, the draw speed is, for example, approximately 120 inches per second. The pre-edge distance 314 is approximately 0.0012 inches and the post-edge distance 316 is approximately 0.0042 inches. These distances leave substantial gaps in the thin walled structure that are not solidified.

In an aspect, gaps in thin walled structures are prevented by using a draw speed less than 50 inches per second. The intensity of the laser 120 is greater toward the center than the edges. Depending on the liquid photopolymer 112, the laser 120 may not solidify the entire area of the beam with a single pulse. Accordingly, the laser 120 produces a cured line width that is less than the beam width. The cured line width also depends on the overlap percentage because the chord formed between the intersecting points of the overlapping circles may define a cured portion that has been exposed to two consecutive pulses.

Figure 4:
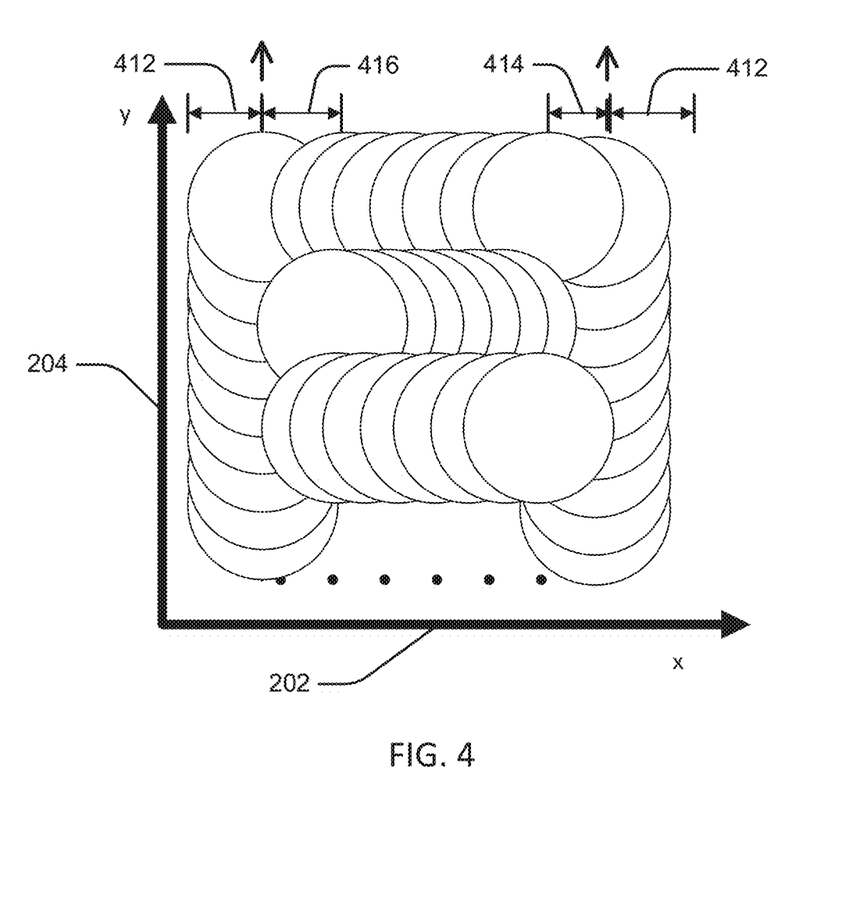
FIG. 4 illustrates a schematic diagram showing the locations of laser pulses according to the scan pattern of FIG. 2 with a draw speed of approximately 40 inches per second.

FIG. 4 illustrates an example part 400 including a thin walled portion formed using a speed of approximately 40 inches per second. The part 400 is formed using the scan pattern 200 including the first edge line 212, the second edge line 214, and the hatch segments 222, 224, 226, 228. As illustrated in FIG. 4, the reduced draw speed results in greater overlap of the circles irradiated by the laser pulses. Moreover, the reduced draw speed decreases the effect of the shutter. Instead of the pre-edge time of approximately 10 µs producing a pre-edge distance of approximately 0.00012 inches, the pre-edge distance 414 is approximately 0.0004 inches. Similarly, the post-edge distance 416 may be reduced to approximately 0.0014 inches. These distances may be less than the cured line width and may prevent the formation of any gaps in the thin walled structures. In an aspect, the line width compensation 412 may also be based on the cured line width.

Figure 5:
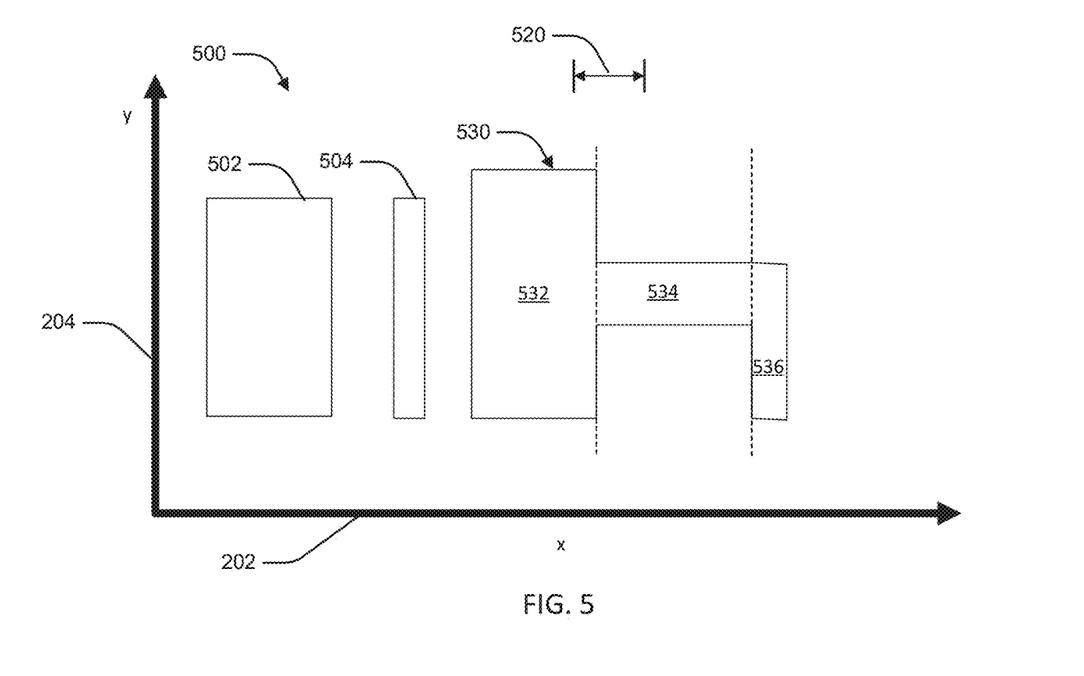
FIG. 5 illustrates a horizontal cross-sectional view of an example layer of a part including several portions

FIG. 5 illustrates a horizontal cross-sectional view of an example layer 500 of a part including several portions. The layer 500 is oriented in the x-y plane along the x-axis 202 and the y-axis 204. Generally, an additive manufacturing apparatus 100 slices a three-dimensional model (e.g., a CAD model) of a part to obtain a layer representation. The apparatus 100 then divides the layer representation into shapes (e.g., polygons). In an aspect, the apparatus 100 determines a draw speed for each shape, or a portion thereof, based on a width of the shape. The width is generally the smallest dimension of the shape in the x-y plane. In an aspect, the width may also be measured in the direction of hatch lines used to fill the interior of the shape. The width is compared to a threshold width 520 to determine whether to use a draw speed based on the cured line width. In an aspect, the threshold width may be a width less than 0.3 inches, preferably less than 0.2 inches, and as small as 0.005 inches. The threshold may also be based on the cured line width, for example, the threshold may be 20 times the cured line width.

Portion 502 is a relatively wide rectangle. The dimensions of the portion 502 exceed the threshold width 520 in both the x and y dimensions. Accordingly, the apparatus 100 scans the portion 502 using a higher draw speed, which may be based on a beam width. The higher draw speed is, for example, greater than 100 inches per second.

Portion 504 has a width in the x dimension that is less than the threshold width 520. Accordingly, the apparatus 100 scans the portion 504 using a lower draw speed, which may be based on the cured line width. The lower draw speed is, for example, less than 50 inches per second.

A shape may also include multiple portions. For example, the shape 530 includes portions 532, 534, and 536. Portion 532 is a relatively wide rectangle having dimensions that exceed the threshold width 520 in both the x and y dimensions. Accordingly, the apparatus 100 scans the portion 532 using the higher draw speed. The portion 534 has a y dimension less than the threshold width 520. Accordingly, the width of the portion 534 is considered along the y dimension and the apparatus 100 scans the portion 534 using the lower draw speed. In an aspect, if the hatch lines are oriented in the x dimension, the width of portion 524 is considered to exceed the threshold width 520 and the portion 534 is scanned using the higher draw speed. Portion 536 has a width in the x dimension that is less than the threshold width 520. Accordingly, the portion 536 is scanned using the lower draw speed.

Figure 6:
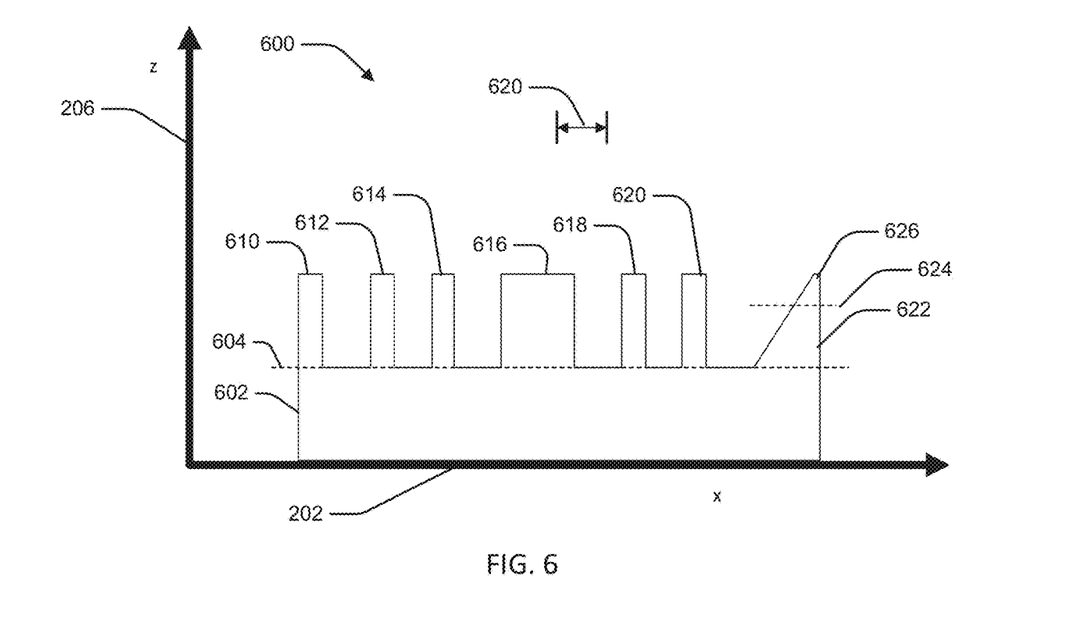
FIG. 6 illustrates a vertical cross section of a part including multiple portions.

FIG. 6 illustrates a vertical cross section of a part 600 including multiple portions. A base portion 602 has a width in the x-dimension that exceeds the threshold width 520. As the part 600 reaches the height 604, some portions built on top of the base portion 602 have a width less than the threshold width 620. For example, portions 610, 612, 614, 618 and 620 have a width less than the threshold width 620. Accordingly, the portions 610, 612, 614, 618 and 620 are scanned using the lower draw speed. In contrast, the portion 616 has a width exceeding the threshold width 620 and is scanned with the higher draw speed. A portion 622 has a variable width. The draw speed for portion 622 is selected for each layer. For example, the base of portion 622 has a width greater than the threshold width 620 and is scanned with the greater draw speed. When the portion 622 reaches the height 624, the width becomes less than the threshold width 620. Accordingly, a portion 626 above the height 624 is scanned with the lower draw speed.

Figure 7:
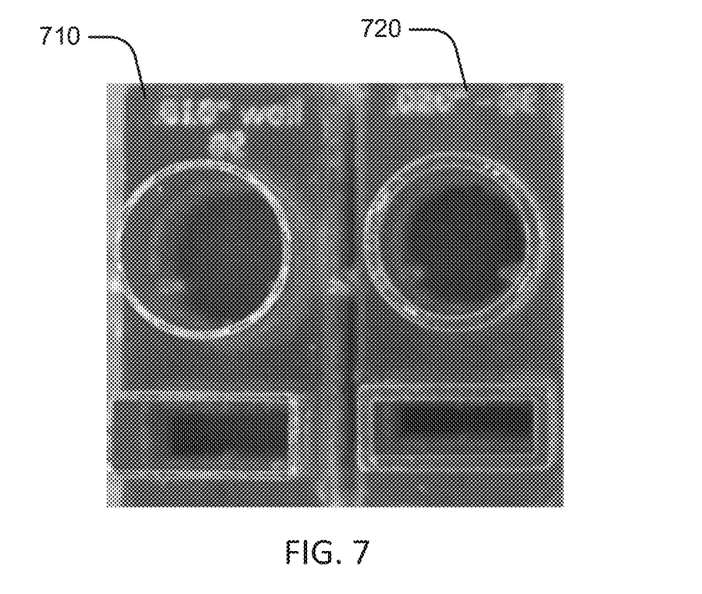
FIG. 7 is a photograph of two parts manufactured with a draw speed of approximately 120 inches per second

FIG. 7 is a photograph of two parts manufactured with a draw speed of approximately 120 inches per second. In each part, a top portion is a vertical cylinder and a bottom portion is a rectangular vertical wall. In the part 710, both portions have a width of 0.010 inch. In the part 720, both portions have a width of 0.020 inch. The light colored areas are places where the liquid photopolymer did not fully cure. The problem of uncured liquid photopolymer is more pronounced in part 710, but also a problem in part 720.

Figure 8:
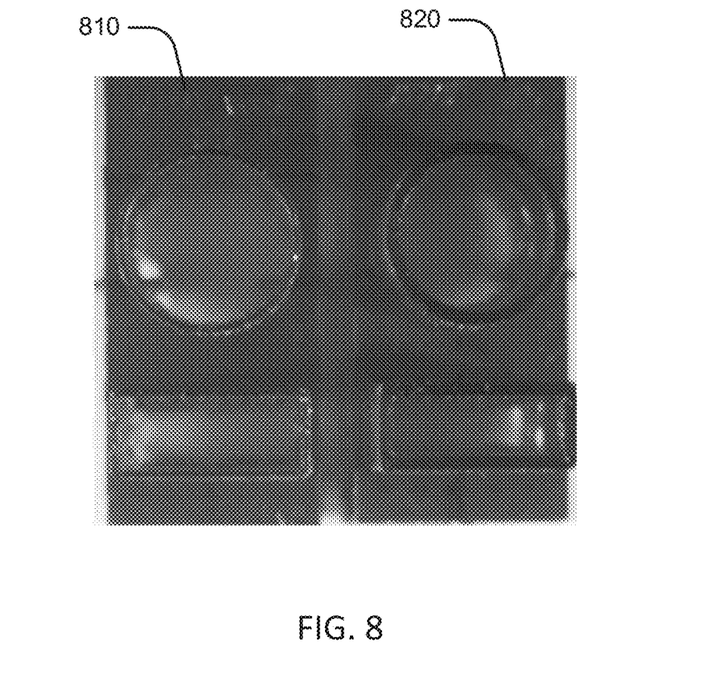
FIG. 8 is a photograph of two parts manufactured with a draw speed of approximately 40 inches per second.

FIG. 8 is a photograph of two parts manufactured with a draw speed of approximately 40 inches per second. The part 810 corresponds to the part 710, i.e., they were based on the same CAD model and were intended to have the same dimensions. Similarly, the part 820 corresponds to the part 720. In FIG. 8, the walls have significantly less uncured photopolymer.

Figure 9:
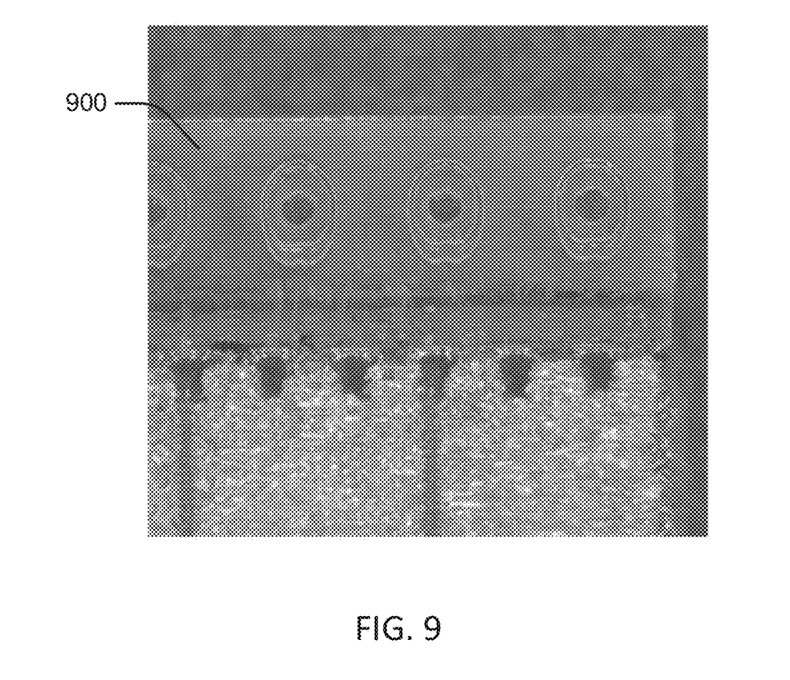
FIG. 9 is a photograph of an example part having a plurality of hollow cylinders oriented horizontally that was manufactured with a draw speed of approximately 120 inches per second.

Using a reduced draw speed based on the cured line width also affects thin walled structures and other fine features oriented transverse to the x-y plane. FIG. 9 is a photograph of an example part 900 having a plurality of hollow cylinders oriented horizontally. The part 900 was manufactured with a draw speed of approximately 120 inches per second. The bottom edges of the cylinders are not round because portions of the cylinder cure to a deeper depth than others. For example, when forming the edge lines in a layer of the cylinders, the pulses are evenly spaced. However, the hatch lines oriented transverse to the axis of the cylinders include gaps as in FIG. 3. Accordingly, the sides of the cylinders cure to a greater depth than the bottom of the cylinder, producing a shape that is out of round.

Figure 10:
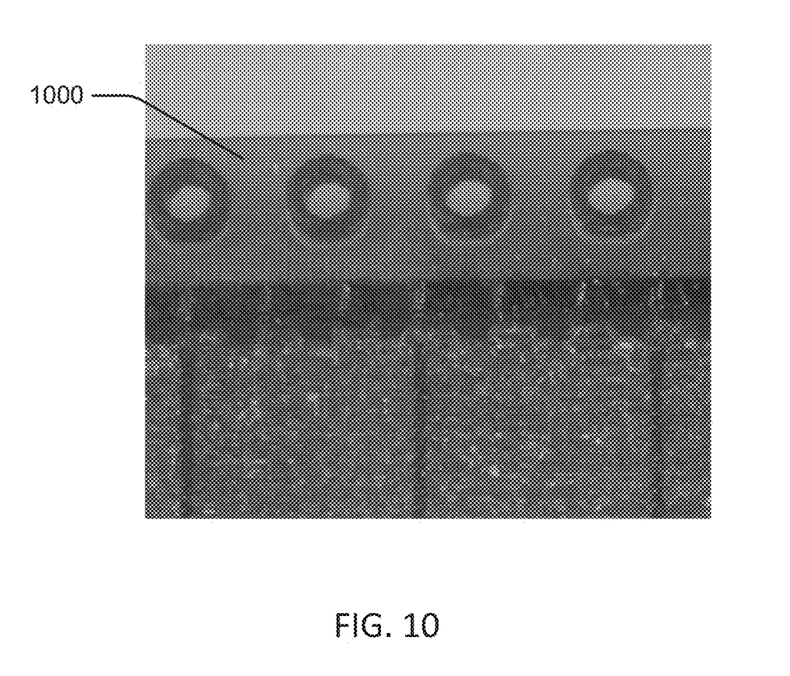
FIG. 10 is a photograph of an example part having a plurality of hollow cylinders oriented horizontally that was manufactured using a draw speed of approximately 40 inches per second.

FIG. 10 illustrates an example of a part 1000 having a plurality of hollow cylinders oriented horizontally that is manufactured using a draw speed of approximately 40 inches per second. The lower draw speed results in a more consistent cure depth and a more rounded shape.

Although the present disclosure has been described with respect to an SLA AM process, it should be appreciated that other AM processes such as direct metal laser sintering (DMLS) and direct metal laser melting (DMLM) use similar scanning techniques. Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques.

As another example, the techniques described herein can be applied to digital light projection (DLP). In one aspect, DLP may be similar to SLA in that light is projected downward onto a liquid surface. In another aspect, DLP differs from the above discussed powder bed and SLA processes in that the light curing of the polymer occurs through a window at the bottom of a resin tank that projects light upon a build platform that is raised as the process is conducted. Further, the polymerization occurs between the underlying window and the last cured layer of the object being built. One suitable DLP process is disclosed in U.S. Pat. No. 9,079,357 assigned to Ivoclar Vivadent A G and Technishe Universitat Wien, as well as WO 2010/045950 A1 and U.S. Publication Number 2011/0310370, each of which are hereby incorporated by reference.

Figure 11:
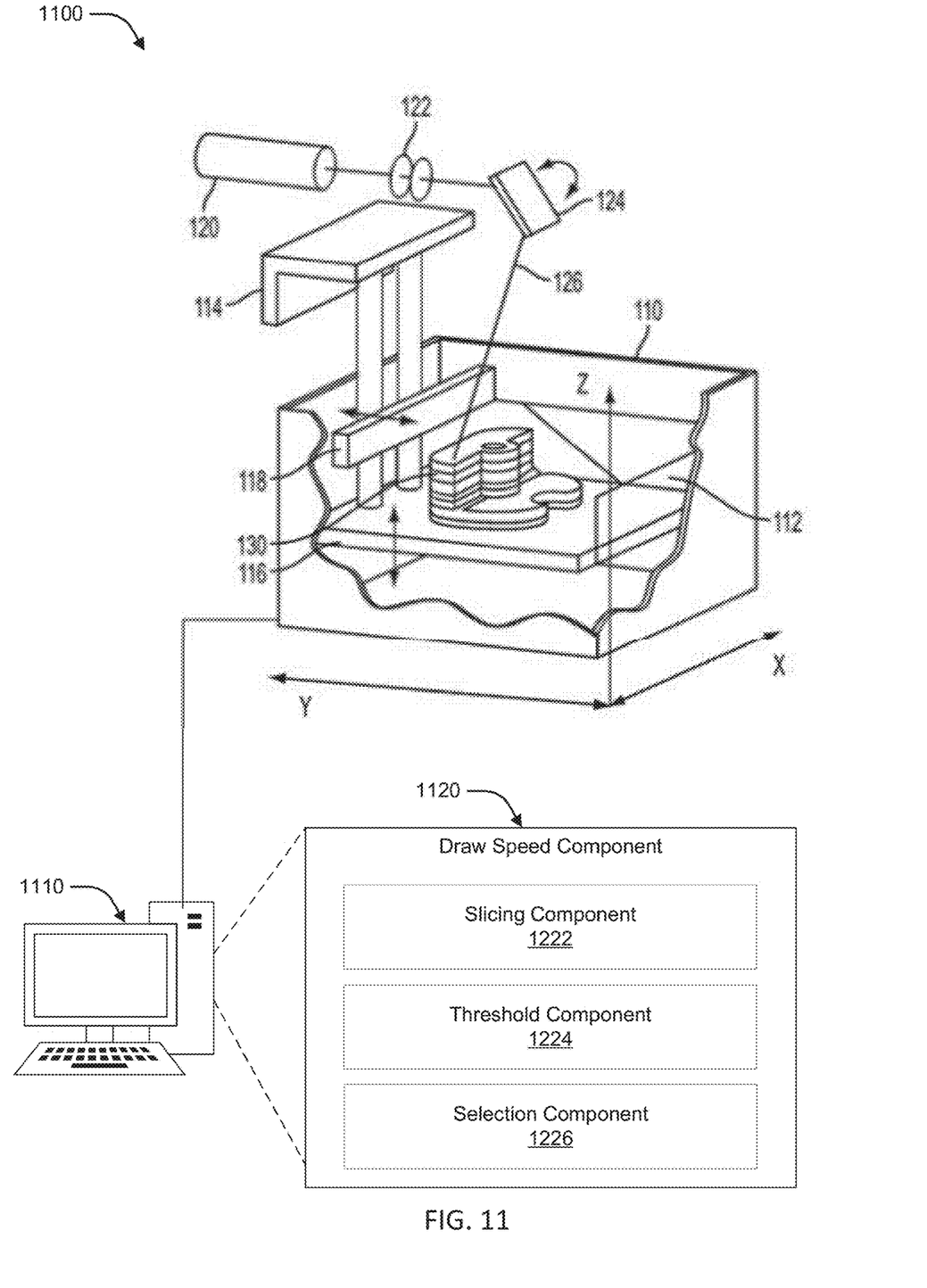
FIG. 11 is a conceptual diagram showing components of an exemplary additive manufacturing system according to an aspect of the disclosure.

FIG. 11 is a conceptual diagram showing components of an exemplary additive manufacturing system 1100 according to an aspect of the disclosure. In an aspect, the additive manufacturing system 1100 may be an SLA system that includes various components of the additive manufacturing apparatus 100 (FIG. 1) such as the vat 110, liquid photopolymer 112, elevator 114, build plate 116, recoater 118, laser 120, lenses 122, and scanning mirror 124. As mentioned above, the disclosed techniques may be used with other layer based additive manufacturing apparatuses and similar components may perform similar functions. For example, the additive manufacturing system 1100 may include a container that stores a raw material such as the vat 110, a tank having a translucent bottom portion in an DLP system, or a powder bed in a DLMS or powder ceramic system. The additive manufacturing system 1100 also includes a radiation source that solidifies the raw material when applied to the raw material. For example, the laser 120 is a radiation source and other radiation sources include an energy beam, and a light source (including ultra-violet light). The additive manufacturing system 1100 also includes a scanner that applies the radiation source to portions of the raw material within a current layer to form a portion of an object. The scanner may include the scanning mirror 124, a galvo scanner, or a modulator with which the intensity of a light source can be adjusted position-selectively under the control of a control unit. The additive manufacturing system 1100 also includes an elevator that moves the raw material or the object to change the current layer. The elevator may include the elevator 114, an adjustable build plate, or an elevator that moves the radiation source.

The additive manufacturing system 1100 also includes a computer 1110. The computer 1110 may be a separate computer or may be integrated with the above components of the additive manufacturing system 1100. The computer 1110 may include a digital processor communicatively coupled to a computer-readable medium such as a random access memory and/or hard drive. The computer-readable medium may store computer executable instructions that are executed by the processor to control the additive manufacturing system 1100. In an aspect, the computer executable instructions are firmware for controlling the additive manufacturing system 1100. In another aspect, the computer executable instructions include a CAD program and/or a standalone program for performing the techniques disclosed herein.

The computer 1110 includes draw speed component 1120. In an aspect, the draw speed component 1120 is a processor configured execute computer executable instructions stored on a computer-readable storage medium. The draw speed component 1120 includes a slicing component 1122 that is configured to generate layer representations of an object based on a 3D model of the object according to a slicing algorithm. For example, the slicing algorithm may average the positions of the object in a top slice and a bottom slice to determine the boundaries of the layer representation between the slices. The slicing component 1222 may determine a width of the object or a portion thereof based on a width of a slice. The draw speed component 1120 also includes a selection component 1124. The threshold component 1224 may be configured to determine whether a portion of an object has a width less than the threshold width. The draw speed component 1120 also includes a selection component 1126. The selection component 1126 is configured to select a draw speed based on whether the width is less than the threshold. For example, the selection component 1126 selects a first, relatively low, draw speed when the width is less than the threshold and selects a second, relatively high, draw speed when the width is greater than the threshold. In an aspect, the selection component may select a draw speed based on other factors such as repetition rate, beam width, cured line width, overlap percentage. The cured line width may be based on the raw material such as the liquid photopolymer. In an aspect, the selection component 1226 may select a draw speed corresponding to a current liquid photopolymer in use.

Figure 12:
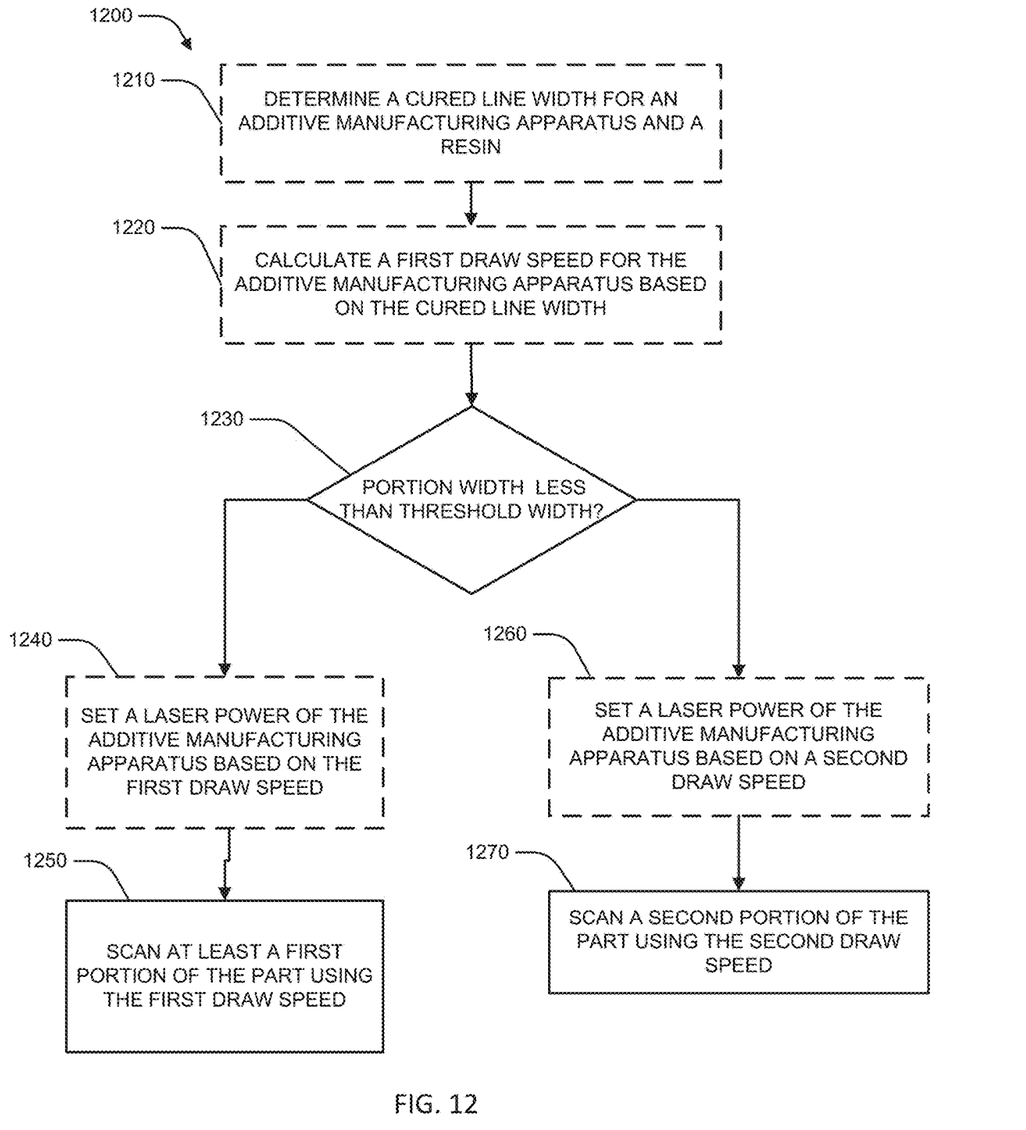
FIG. 12 is a flowchart illustrating an example method of manufacturing a part.

FIG. 12 is a flowchart illustrating an example method 1200 of manufacturing a part. The method 1200 is performed by a specially programmed computer (e.g., computer 1110) that controls an additive manufacturing system 1100.

In an aspect, the specially programmed computer is part of the additive manufacturing system 1100 and includes firmware for controlling the additive manufacturing system 1100. In an aspect, the specially programmed computer also includes a CAD program that processes a three-dimensional model of a part. The specially programmed computer may further include an extension to the CAD program that performs the method 1200 or a separate program that controls the computer to perform the method 1200. The computer program may be stored on a non-transitory computer-readable storage medium as computer executable code for controlling the computer 1110 and/or the system 1100. In an aspect, the computer 1110 is communicatively coupled to an AM apparatus such as the system 1100. The system 1100 operates based on a three dimensional model of the part (e.g., part 130). The model of the part is oriented according to an x-y build plane corresponding to an orientation of a layer of the part and a z-axis orthogonal to the x-y build plane that defines an order of each layer of the part.

In block 1210, the method 1200 optionally includes determining a cured line width for an additive manufacturing apparatus and a resin. For example, the selection component 1226 determines the cured line width for the additive manufacturing system 1100 and a resin. For example, the resin is the liquid photopolymer 112 currently in the vat 110. In an aspect, the computer 1110 determines the cured line width according to a table of stored values for a combination of active parameters. In another aspect, the additive manufacturing system 1100 measures cured line width. For example, the additive manufacturing system 1100 may measure a cured line width formed when scanning an edge line 212 or 214. In another aspect, an operator enters the cured line width for the system 1100 and the resin.

In block 1220, the method 1200 optionally includes determining a first draw speed for the additive manufacturing apparatus. In an aspect, the computer 1110 determines the first draw speed. The first draw speed may be based on other parameters of the apparatus 100 such as, for example, a repetition rate of laser 120, a desired overlap percentage, or a beam width. In an aspect, the cured line width may be dependent on one or more of the repetition rate of laser 120, the desired overlap percentage, or the beam width. In another aspect, a first draw speed corresponding to various liquid photopolymers may be stored in a look up table. The selection component 1226 may determine a current liquid photopolymer and select the corresponding first draw speed.

In block 1230, the method 1200 includes determining whether a portion of the part has a width less than a threshold width. The threshold component 1224 compares the width of the part to the threshold width. If the width of the portion is less than the threshold width, the method 1200 proceeds to block 1240. If the width of the portion is not less than the threshold width, the method 1200 proceeds to block 1260.

In block 1240, the method 1200 optionally includes setting a laser power of the additive manufacturing system 1100 based on the first draw speed. In an aspect, for example, the computer 1110 sets the power of the laser 120 based on the first draw speed. The first draw speed determines a number of pulses in an area and the overlap of the pulses. The computer 1110 sets the power of the laser 120 control a cured depth. For example, the computer 1110 sets the cure depth equal to a build layer thickness.

In block 1260, the method 1200 includes scanning at least a first portion of the part using the first draw speed. In an aspect, for example, the system 1100 scans the at least first portion of the part (as determined by a CAD model) using the scanning mirror 124 to move the beam of the laser 120 at the first draw speed. In an aspect, the first portion of the part is a thin wall having a width less than a threshold width. The thin wall may, for example, have a width less than 0.3 inches, preferably less than 0.2 inches. The width of the thin wall is less than 20 times the cured line width. In an aspect, the first portion includes an interior of a shape. For example, referring to FIG. 2, the hatch lines 220 are scanned using the first draw speed. In another aspect, the entire thin walled portion 210 is scanned using the first draw speed.

In block 1260, the method 1200 optionally includes setting the laser power of the additive manufacturing apparatus based on the second draw speed. Similar to block 1240, for example, the computer 140 sets the power of the laser 120 based on the second draw speed before scanning using the second draw speed to control a cured depth.

In block 1270, the method 700 includes scanning a second portion of the part using the second draw speed. In an aspect, for example, the system 1100 scans the second portion of the part (as determined by a CAD model) using the scanning mirror 124 to move the beam of the laser 120 at the second draw speed. In an aspect, the second portion of the part has a width greater than the threshold width. For example, the second portion of the part has a width greater than 0.3 inches. In an aspect, any portion of the part may be classified by the computer 1110 as a thin walled portion having a width less than the threshold width or a thicker portion having a width greater than the threshold width. The system 1100 scans the thin walled portions using the first draw speed and scans the thicker portions using the second draw speed. In another aspect, the second portion may include an external surface of a shape. The system 1100 may scan the external surfaces or edges of the shape with the second draw speed even if the shape is a thin portion because the external edges are longer than the width and in a different direction.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A stereolithography apparatus comprising:
   a vat containing liquid photopolymer resin;
   a pulsed laser that produces a laser beam that irradiates the liquid photopolymer resin thereby solidifying the liquid photopolymer resin;
   a scanning mirror that moves the laser beam across a surface of the liquid photopolymer resin;
   a memory storing executable instructions;
   a processor communicatively coupled to the memory and configured to execute the instructions to control the laser beam and scanning mirror to:
      scan a first portion of the liquid photopolymer resin with the laser beam at a first draw speed, wherein the first portion of the liquid photopolymer resin corresponds to a first portion of a part that has a width less than a threshold width, the threshold width being between 0.005 inches and 0.030 inches; and scan a second portion of the liquid photopolymer resin with the laser beam at a second draw speed that is greater than the first draw speed, wherein the second portion of the liquid photopolymer resin corresponds to a second portion of the part that has a width greater than the threshold width.

2. The stereolithography apparatus of claim 1, wherein the processor is configured to execute the instructions to control the laser beam and scanning mirror to: scan the liquid photopolymer using a pulsed laser having a repetition rate of at least 67,000 pulses per second at a draw speed less than 50 inches per second.

3. The stereolithography apparatus of claim 2, wherein the draw speed is less than 40 inches per second.

4. The stereolithography apparatus of claim 1, wherein the laser beam is a pulsed laser.

5. The stereolithography apparatus of claim 4, wherein the pulsed laser has a repetition rate between 25,000 and 200,000 cycles per second.

6. The stereolithography apparatus of claim 1, wherein the first draw speed is less than 50 inches per second and the second draw speed is greater than 100 inches per second.

7. The stereolithography apparatus of claim 6, wherein the first draw speed is less than 40 inches per second.

8. The stereolithography apparatus of claim 6, wherein the second draw speed is greater than 120 inches per second.

9. The stereolithography apparatus of claim 1, wherein the processor is further configured for:

determining, by the stereolithography apparatus, for each portion of the part, whether the portion has a width less than the threshold width; and selecting, by the stereolithography apparatus, the first draw speed or the second draw speed for the respective part based on the determination.

10. The stereolithography apparatus of claim 1, wherein the first portion of the part and the second portion of the part are located at least partially in a single horizontal layer of the part.

11. The stereolithography apparatus of claim 1, wherein the first portion of the part and the second portion of the part are located in different layers of the part, wherein the first draw speed is used for layers including the first portion of the part, and the second draw speed is used for layers including the second portion of the part.

12. The stereolithography apparatus of claim 1, wherein the processor is further configured for:

setting a laser power for the first portion based on the first draw speed.

13. The stereolithography apparatus of claim 1, wherein the processor is configured to execute the instructions to control the laser beam and scanning mirror to:

scan the liquid photopolymer using a pulsed laser having a repetition rate of at least 67,000 pulses per second at a draw speed less than 50 inches per second.

14. A stereolithography apparatus comprising:

a material support for supporting photopolymer;

a pulsed laser that produces a laser beam that irradiates the photopolymer thereby solidifying the photopolymer;

a scanning mirror that moves the laser beam across a surface of the photopolymer;

a memory storing executable instructions;

a processor communicatively coupled to the memory and configured to execute the instructions to control the laser beam and scanning mirror to:

scan a first portion of the photopolymer with the laser beam at a first draw speed, wherein the first portion of the photopolymer corresponds to a first portion of a part that has a width less than a threshold width, the threshold width being between 0.005 inches and 0.030 inches; and scan a second portion of the photopolymer with the laser beam at a second draw speed that is greater than the first draw speed, wherein the second portion of the photopolymer corresponds to a second portion of the part that has a width greater than the threshold width.

15. The stereolithography apparatus of claim 14, wherein the material support is a vat and the photopolymer is a liquid photopolymer contained within the vat.

16. The stereolithography apparatus of claim 14, wherein the processor is configured to execute the instructions to control the laser beam and scanning mirror to:

scan the photopolymer using a pulsed laser having a repetition rate of at least 67,000 pulses per second at a draw speed less than 50 inches per second.

17. The stereolithography apparatus of claim 16, wherein the draw speed is less than 40 inches per second.

18. The stereolithography apparatus of claim 14, wherein the laser beam is a pulsed laser having a repetition rate between 25,000 and 200,000 cycles per second.

* * * * *